(12) United States Patent
Huang et al.

(10) Patent No.: US 7,242,871 B2
(45) Date of Patent: Jul. 10, 2007

(54) HIGH DYNAMIC RANGE OPTICAL RECEIVER

(75) Inventors: Wei Huang, San Jose, CA (US); Yuriy Shkelev, San Francisco, CA (US)

(73) Assignee: Harmonic Inc., Sunnyvale, CA (US)

( * ) Notice: Subject to any disclaimer, the term of this patent is extended or adjusted under 35 U.S.C. 154(b) by 630 days.

(21) Appl. No.: 10/630,535

(22) Filed: Jul. 29, 2003

(65) Prior Publication Data

US 2005/0025504 A1    Feb. 3, 2005

(51) Int. Cl.
    *H04B 10/06* (2006.01)
(52) U.S. Cl. .................... 398/210; 398/202
(58) Field of Classification Search ........... 398/210, 398/202
    See application file for complete search history.

(56) References Cited

U.S. PATENT DOCUMENTS

| | | | | |
|---|---|---|---|---|
| 4,353,100 A * | 10/1982 | Inoue | ............. | 360/65 |
| 4,764,732 A * | 8/1988 | Dion | ............. | 330/59 |
| 4,771,449 A * | 9/1988 | Kiko et al. | ............. | 379/93.05 |
| 4,805,236 A | 2/1989 | Urala | | |
| 5,008,524 A | 4/1991 | Reutter et al. | | |
| 5,179,461 A | 1/1993 | Blauvelt et al. | | |
| 5,386,109 A | 1/1995 | Ikeuchi et al. | | |
| 5,734,300 A | 3/1998 | Yoder | | |
| 6,057,738 A | 5/2000 | Ku et al. | | |
| 6,351,183 B1 * | 2/2002 | Khabbaz et al. | ............. | 330/51 |
| 6,462,327 B1 | 10/2002 | Ezell et al. | | |
| 6,545,537 B2 * | 4/2003 | Ohashi et al. | ............. | 330/254 |
| 6,690,506 B2 * | 2/2004 | Zahnley et al. | ............. | 359/337.11 |
| 2003/0063354 A1 * | 4/2003 | Davidson | ............. | 359/189 |

OTHER PUBLICATIONS

Agilent Technologies (2001). "Surface Mount RF PIN Switch and Limiter Diodes," Agilent Technologies Technical Data On HSMP382x Series and HSPM482x Series, pp. 1-8.
Alexander, S. (1997). *Optical Communication Receiver Design* SPIE Optical Engineering Press: Bellingham, WA pp. v-vii. (Table of Contents Only.).
Raskin, D. and Stoneback, D. (1998). *Broadband Return Systems for Hybrid Fiber/Coax Cable TV Networks* Prentice Hall: NJ. pp. v-x. (Table of Contents Only.).
Sniezko, O.J. and Werner, T. (1997). "Return Path Active Components Test Methods and Performance Comparison," *1997 Conference on Emerging Technology*, Nashville, TN. pp. 263-294.

* cited by examiner

*Primary Examiner*—Jason Chan
*Assistant Examiner*—Ken Malkowski
(74) *Attorney, Agent, or Firm*—Morrison & Foerster LLP

(57) ABSTRACT

An optical receiver, for use for instance in an analog optical communications system such as a return path in cable television, operates over a wide range of input power to its photodetector. This is accomplished by providing in the optical receiver a series of RF amplifier stages where at least one of the stages includes a fixed attenuator and a parallel amplifier with switches suitably connected so that, at any one time, only one of the fixed attenuator or the amplifier is in the signal path. The switches are controlled so that the dynamic range of the optical receiver is improved in order to make gain reduction more accurate. Hence by redirecting the RF signal path to either the attenuator or amplifier of the amplifier stage, excessive noise and distortion by the amplifier stage are eliminated or reduced.

21 Claims, 3 Drawing Sheets

HIGH DYNAMIC RANGE OPTICAL RECEIVER

FIELD OF THE INVENTION

This disclosure relates to optical communications and especially to RF amplification in analog optical communications.

BACKGROUND OF THE INVENTION

The disclosure is directed to extending the dynamic range of analog optical receivers of the type used in Hybrid (optical) Fiber/Coax (HFC) return path systems such as used in cable television. Due to system characteristics, the optical receivers in such systems often face a large variation in the optical input power requirement, that results in an even larger variation in the RF gain requirement. The conventional solution is to add attenuation to reduce the excessive gain. This is a simple and straightforward approach and works well when the needed attenuation is relatively small. However, when the amount of needed attenuation is close to the gain of the amplifier, the added attenuation produces unwanted noise and distortion.

In a HFC system such as a cable television or other communications network, the "forward path" (head end to subscriber) media (optical fiber and coaxial cable) carries modulated video, data, and cable telephony signals. In the return path (subscriber to head end), the media carries mainly data signals in the QPSK or QAM modulation format and frequency division multiplexed within the frequency bandwidth of interest, e.g., 5 to 42 MHz. The return path data signals originate as electrical signals from cable modems at various subscriber locations, are combined at an optical node, and transmitted therefrom by an optical transmitter. The corresponding optical receiver converts the transmitted optical signal into an electrical RF (Radio Frequency) signal and then amplifies the RF signal to the desired output level. The RF signal is then combined with other optical receiver RF output signals and transmitted to a CMTS (Cable Modem Termination System) input and ultimately to the system head end.

Because of the nature of a HFC system, the optical receiver often faces a large variation of optical input power depending on the optical transmitter optical output power, link loss, the number of receivers combining signals at the CMTS input, and the CMTS input power requirement. The optical power received by an optical receiver can be as low as −15 dBm and as high as +2 dBm. For every 1 dB of optical power variation, the corresponding RF signal varies by two dB due to the optical receiver's optical to electrical conversion process in its photodetector. For optical power varying 17 dB (from −15 dBm to +2 dBm) the RF signal will vary by 34 dB. This is a very large gain variation. Therefore the optical receiver must be capable of providing RF signal gain over a broad range. In addition, sometimes a certain degree of optical AGC (Automatic Gain Control) is desirable in order to maintain the signal stability and additional gain must be preserved to allow the AGC to take effect. This adds further gain variations.

In a HFC network return path, a key system performance parameter is the NPR (Noise Power Ratio) dynamic range. NPR is the ratio of carrier magnitude to unwanted noise magnitude. For a return path to operate seamlessly, the system NPR must meet a minimum requirement, otherwise errors occur and system transmission speed slows down. If the NPR is plotted on a y-axis of a graph and the system input or output power is plotted on the graph x-axis, the resulting curve usually has a reverse V shape. The dynamic range is the dB difference between the two input or output power points at which the NPR is identical.

Dynamic range thus is essentially the "headroom" at which the return path operates. The headroom is required because in the return path there are various unpredictable sources of noise interference such as impulse noise and ingress (external) noise. The larger the dynamic range, the better is the system performance in dealing with unpredictable noise interference. The dynamic range defined here is that in which the low end of carrier performance is limited by CNR (carrier to noise ratio) and the high end is limited by second or third order distortion. On NPR plots, the noise contribution to the left side of the reverse V shape curve is thermal noise and the noise contribution to the right side of the curve is distortion noise. The distortion noise is due to system or device non-linearity. If the carrier signal is a CW (continuous wave) tone, the distortions are manifested as second and third order harmonics. Since the return path signal carriers are in the form of QPSK and QAM, their power spectral densities are alike in terms of thermal noise and therefore its harmonics are also alike in terms of thermal noise.

In a typical system, the NPR is predominately the optical transmitter NPR in the middle of the optical power range received by the associated optical receiver. However, at very low and very high optical power, the optical receiver's NPR dominates the system's NPR. At very low input optical power, the optical receiver thermal noise contributes the majority of the noise, and at very high optical input power the optical receiver distortion noise contributes majority of the noise. In the optical receiver, noise contributions in terms of components are from the photo-detector and RF amplifiers. Commercially available analog photodetectors are well behaved in both respects such that additional improvement in this area requires substantial component cost increase with little or no improvement of overall system performance. RF amplifiers, on the other hand, are available with various performance tradeoffs between gain, noise figure, distortion and power consumption. Generally speaking, one skilled in this field will have little difficult choosing the amplifiers having the best tradeoffs. What remains is the gain and attenuation approach to obtain optimum performance for both extreme (high and low) power conditions.

There are known approaches to solve this in the field of digital communications where the signals are base band signals operating between two (digital) logic states. These approaches are not applicable to analog optical receivers as in cable television systems, because many performance requirements critical to analog optical receivers are not critical to digital optical receivers. For example, transimpedance amplifiers used in digital communications inherently have low performance in terms of distortion. Also, impedance matching and frequency response are not critical in digital communications but important in an analog receiver. Therefore in analog systems in order to support large power variations of the gain portions for an optical receiver, matched attenuators are connected between the RF amplifier stages, see FIG. 1.

FIG. 1 shows a receiver the primary optical element of which is photodetector (phototransistor or photodiode) D1 12. This is conventionally arranged so that it receives light, as indicated, from e.g. an optical fiber, via a lens (not shown). Diode 12 is coupled to a voltage source V with filter capacitor C1 14 and the diode 12 output current is coupled to a transformer T1 16. Blocking capacitor C2 18 couples the output RF signal from the transformer T1 (but blocks any D.C. signal) to the first of a series of amplifier stages which in this case includes an RF amplifier A1 20 and a variable attenuator P1 22. Each of the two subsequent stages respectively also includes an amplifier and variable attenuator 24, 26; 28, 30. The attenuators provide a constant impedance (at any one setting). The final stage includes only the amplifier A4 32 providing the RF output signal. The variable attenuators 22, 26, 30 are each controlled, via its control terminal, by a control circuit 36 which senses the level of output power from photo-detector D1 across resistor R1 34.

The number of amplifiers used depends on the gain required and the gain of each amplifier. In this configuration, the noise performance of amplifier A1 makes the most noise contribution while amplifier A4 makes the most distortion contribution. The operating points for amplifiers A1 and A4 are set by the system requirements and after the particular amplifiers are chosen, a base line for the achievable maximum dynamic range is set. The dynamic range performance further degrades when the inter-stage amplifiers' (A2, A3) noise and distortion contribution become significant. Tradeoffs must be considered in order to minimize the contribution by the inter-stage amplifiers. When the RF signals vary in strength as much as 30 dB, the inter-stage amplifier contribution will unavoidably be significant. Generally speaking, more stages allow better thermal noise and distortion performance tradeoffs. In the case of low optical input power, the attenuation is allocated to attenuators P2 and P3 with zero attenuation at attenuator P1 in order to minimize the noise contribution by amplifier A2. In the case of high optical input power, the attenuation is distributed among the three attenuators P1, P2, P3 where attenuator P3 has the lowest attenuation in order to minimize the distortion contribution by amplifier A3.

In order to illustrate this, assume the amplifiers in FIG. 1 are all identical and each has a gain of 15 dB. Further assume that for a given set of conditions, when optical input power is −15 dBm, all attenuators P1, P2, P3 must be set to 0 dB attenuation to achieve required RF output power. If the same RF output power must be maintained when the optical input power is changed to 0 dBm, then 30 dB attenuation is required in the signal path. If the 30 dB attenuation is evenly distributed among attenuators P1 and P3 (that is, 15 dB each) while the attenuation of attenuator P2 is set to zero, then amplifier A2 will make exactly the same thermal noise contribution as does amplifier A1, since the input power to these two amplifiers is identical.

By the same token, amplifier A3 will make exactly the same distortion contribution as amplifier A4, since the output power of these two amplifiers is identical. When this occurs, the thermal noise degradation is 3 dB while second order distortion degradation is 3 dB and third order distortion degradation is 6 dB. These are significant degradations for receiver performance and when the receiver is used in a system, the overall system NPR performance will be degraded. In this example, a 3 dB receiver thermal noise degradation may not be a significant degradation for the system since the transmitter thermal noise is still dominant, but 6 dB receiver distortion degradation can be significant. If the trade off is made to reduce the distortion but increase thermal noise, then the thermal noise contribution by the receiver will take effect. Of course, if the attenuation is distributed among all three attenuators, the degradation will be reduced but this will not be significant, and so this requires a more elaborate attenuation scheme.

SUMMARY

This disclosure is directed to improving the dynamic range of an optical receiver, of the type used in analog optical communications, by redirecting the RF signal path to reduce the gain instead of adding attenuation, and thereby switchably leaving an unused RF amplifier in the signal path. The redirection is accomplished in one embodiment by connecting a pair of single pole double throw (SPDT) switches at both the input and output terminals of the amplifier. The RF signal path is redirected when the reduction of gain is close to the gain of the amplifier. By directing the RF signal path, excessive noise and distortion due to unwanted gain and loss are eliminated and consequently, the NPR (Noise Power Ratio) dynamic range is increased. The switches are implemented in the form of e.g., a relay, or PIN or Schottky diode pairs, or other types of switches.

The signal path redirection can be done dynamically, when the return path is in normal operation. The redirection is more commonly used when the cable TV system is first set up, and is especially useful then since it allows use of one type of amplifier in the return path at various system locations, in spite of system-caused variations in optical power.

DETAILED DESCRIPTION

Figure 1:
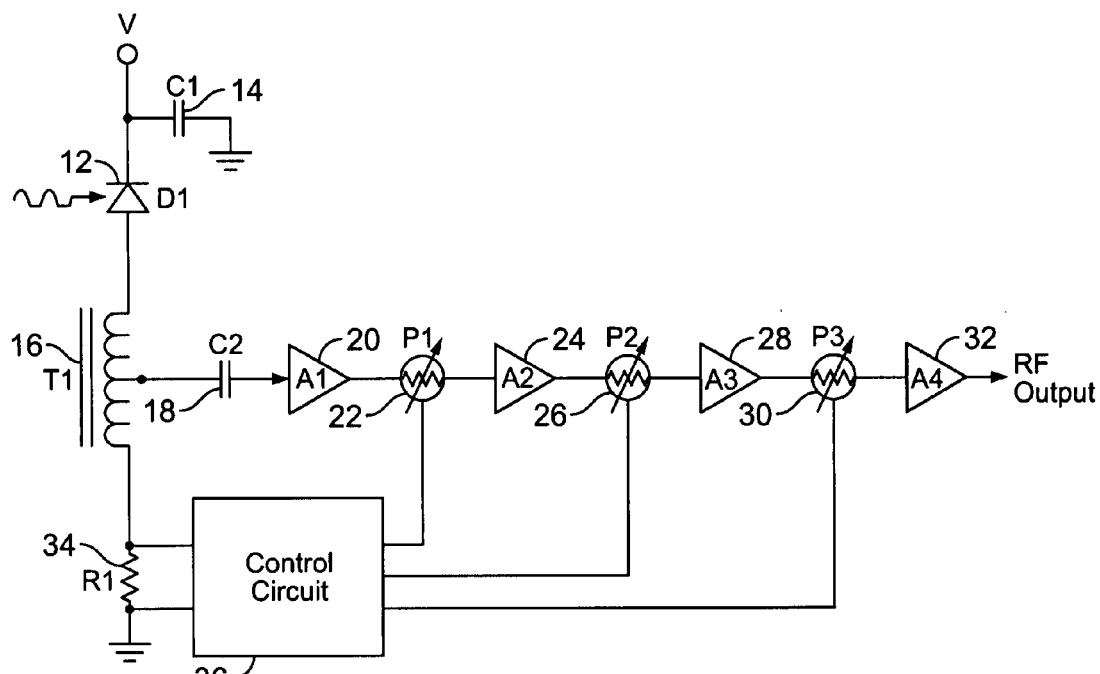
FIG. 1 shows schematically an optical receiver with variable attenuators.
Figure 2:
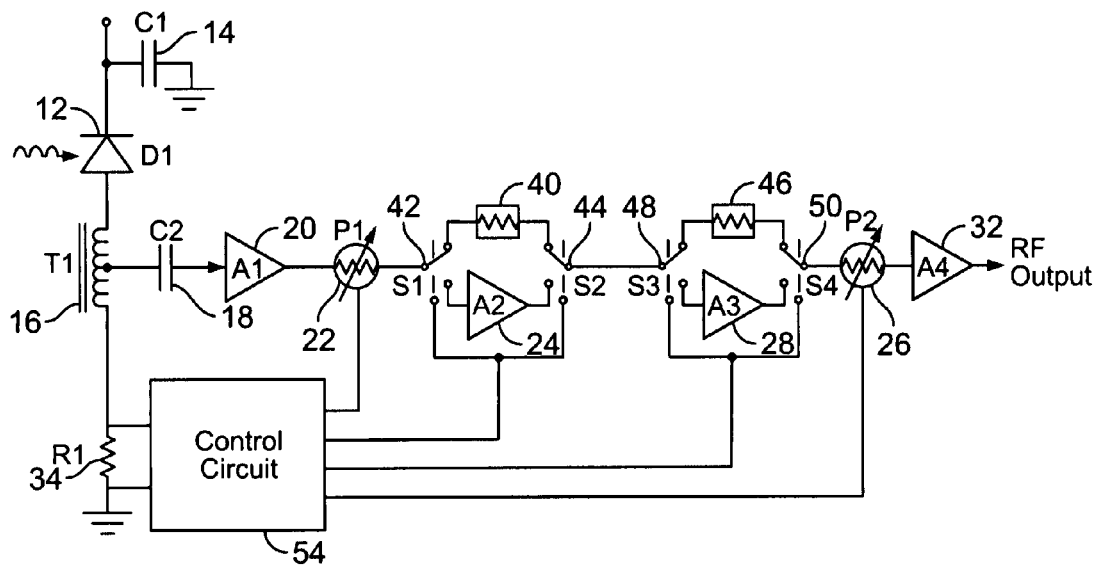
FIG. 2 shows schematically an optical receiver in accordance with the invention with switched stages.

FIG. 2 illustrates the present optical receiver that includes elements mostly similar to those of FIG. 1, and which are similarly labeled. However, in FIG. 2 the second amplifier stage includes a parallel arranged fixed attenuator 40 which can be coupled to the output terminal of attenuator 22 via switch S1 42. In its upper position, switch S1 couples fixed attenuator 40 into the signal path; in its lower position switch S1 couples in amplifier A2. Attenuator 40 is, e.g., conventionally a "T" of three resistors or an equalizer (R, L, C circuit) providing a constant impedance or a similar circuit providing attenuation. Similarly, switch S2 44 operates in conjunction with switch S1 to couple either attenuator 40 or amplifier A2 in the signal path. Thus at any one time either attenuator 40 or amplifier A2 is connected in the signal path. The second amplifier stage including switches S3, S4 (respectively 48 and 50) operates similarly. As shown, switches S1 and S2 are single pole double throw switches as are switches S3 and S4 and all the switches are controlled by the control circuit 54 as described further below. The redirected signal path thereby is simply a straight through connection or one with a fixed attenuation to make gain reduction more accurate. For example, if the RF amplifier stages have an actual gain of 14.7 dB while 15 dB is more desirable, a 0.3 dB fixed attenuator 40 is provided in the redirected signal path to achieve the gain reduction of 15 dB. The optical receiver is constructed on, e.g., a printed circuit board using conventional microstrip connections to carry the RF signals.

In one variation of the FIG. 2 receiver, terminations are connected to amplifiers A2, A3 when they are switched out of the signal path. In another variation, amplifiers A2, A3 are turned off (powered down) when they are switched out of the signal path.

Figure 3:
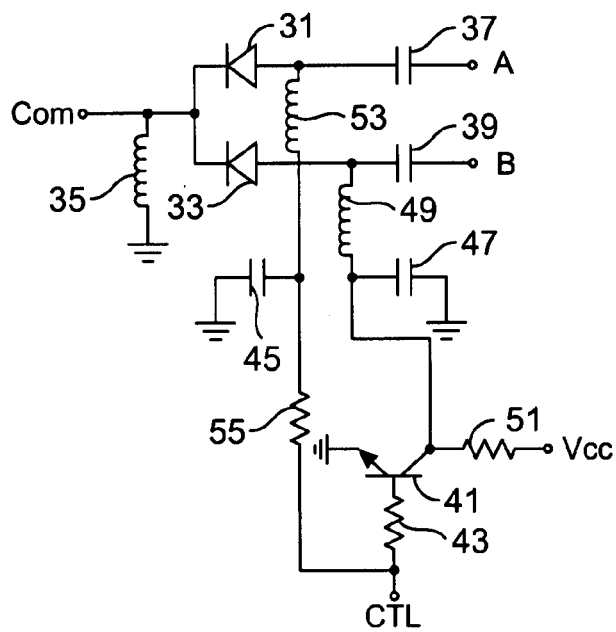
FIG. 3 shows schematically detail of one of the switches of FIG. 2.

FIG. 3 shows in detail an exemplary circuit for, for instance, any one of switches S1, S2, S3, and S4. FIG. 3 illustrates a toggle switch. A common terminal (COM) is common to terminals A and B. Terminal Com corresponds in FIG. 2 to the connection between switch S1 and attenuator P1. Terminals A and B correspond respectively in FIG. 2 to the connections between switch S1 and attenuator 40 and switch S1 and amplifier A2. As shown in FIG. 3, two parallel connected PIN diodes 31, 33 are respectively connected to terminals A and B via filter capacitors 37 and 39. A bipolar transistor 41 has its base (control) electrode connected via resistor 43 to the control terminal CTL which is connected to the control circuit 54, its emitter connected to ground, and its collector connected (via resistor 51) to a voltage source VCC. The transistor 41 collector in turn is connected (via inductor 49) to one terminal of diode 33. Filter capacitors 45 and 47 are also provided, as are inductors 49 and 53 and resistor 55. This is merely one embodiment of a suitable switch, for instance S1, of FIG. 2. The switch works as follows: when a logic high voltage is applied to the control terminal CTL, the connection between terminals Corn and A is closed but the switch connection between terminals Corn and B is open. When a logic low voltage is applied to terminal CTL, the switch reverses, connecting terminals Corn and B.

Thus in addition to controlling variable attenuators 22, 30 as in FIG. 1, control circuit 54 controls switches S1, S2 and S3, S4 responsive to the voltage drop sensed across resistor R1, which voltage is proportional to the input optical power to photodiode D1. In one embodiment, control circuit 54 includes two comparators each with one input terminal connected to resistor R1; one comparator is set to compare the input signal to a voltage equivalent to 15 dB and the second to 30 dB, as disclosed above. The output signal of the first comparator controls (via suitable drivers) switches S1, S2 and the second comparator controls switches S3, S4.

By thereby redirecting the signal path using the switches, the excessive noise and distortion contribution of amplifiers A2 and A3 of FIG. 2 are eliminated. In contrast, in FIG. 1 the large attenuation eliminates the function of the interstage amplifiers but undesirably leaves their unwanted noise and distortion in the signal path and thereby degrades the NPR dynamic range performance.

Figure 4:
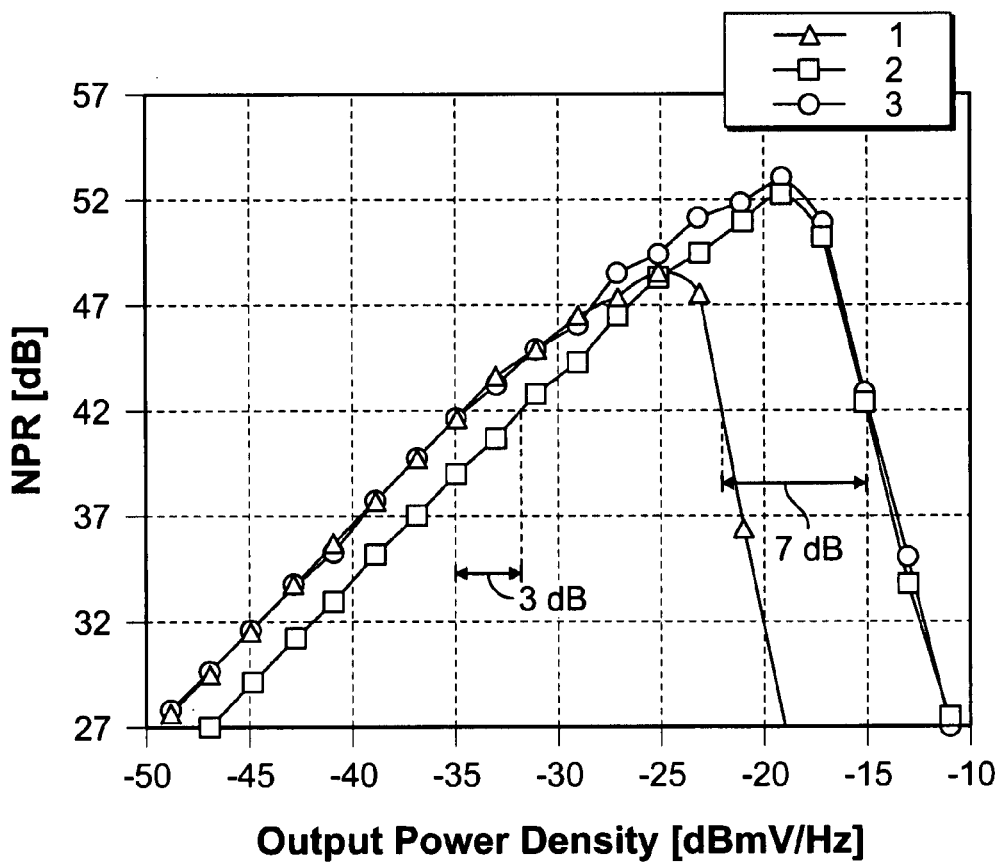
FIG. 4 is a graph of performance of the FIGS. 1 and 2 receivers.

In the corresponding plot of FIG. 4, the horizontal axis shows output power density (dBM V/Hz) with the vertical axis showing noise power ratio (NPR) in dB. This plot compares the NPR comparison for the FIG. 1 approach at curves 1 and 2 (at two different attenuation setting points) and that of the FIG. 2 approach at curve 3. The receivers are in the operating condition as in FIGS. 1 and 2 where all the amplifiers have a gain of 15 dB. The photodetector and optical transmitter are the same for all curves. Finally, the receivers are all set to the same system gain. Curve 1 is the NPR of the FIG. 1 receiver where attenuators P1 and P3 are set to 15 dB attenuation and attenuator P2 is set to 0 dB. Curve 2 is also the NPR of the FIG. 1 implementation but where attenuator P1 is set to 30 dB and attenuator P2 and P3 are set to 0 dB. Curve 3 is for the FIG. 2 receiver. It can be seen that curve 1 has the same NPR at its left side as curve 3, but the right side of the NPR is much worse than that of the curve 3. The dynamic range is about 7 dB worse at an NPR of 42 dB NPR. This is the condition as discussed above. The 3 dB receiver thermal noise degradation has not yet degraded the system performance since the transmitter thermal noise is still dominant. However, the distortion degradation, 3 dB by the second order and 6 dB by the third order, have degraded system performance significantly. For example, the NPR is degraded in such a way that the dynamic range is 7 dB worse at an NPR of 42 dB. Curve 2 is the other side of the extreme where receiver distortion degradation has no impact on the system but receiver thermal noise degradation becomes dominant. It can be seen that the dynamic range is about 3 dB worse at 42 dB NPR. This comparison illustrates that no matter how well one arranges the attenuation in the FIG. 1 receiver, the FIG. 2 receiver always can be controlled to give better performance.

FIG. 2 is one possible implementation of the present optical receiver where optical AGC is required. The control circuit 54 performs the following functions; 1) detecting the input optical power, 2) comparing the detected optical power to one or two sets of thresholds and determining if redirection of the signal path is required, 3) providing a set of driving circuits that driving the variable attenuators, and 4) providing logic to make the tradeoff between the attenuation and signal redirection. The control circuit has a set of logic elements that has two inputs connected to the outputs of two comparators corresponding to 15 dB and 30 dB respectively as described above and two outputs that once the signal is redirected (the switches have changed positions) reset the attenuator to 0 dB. For example, the optical power is initially at the 14.5 dB point. The first comparator is activated since the threshold is the 15 dB point. The attenuation driving circuit sets the total attenuation at 14.5 dB. Now the optical power is increased to the 15 dB point, the first comparator is activated and causes the switch to change its position and also activate the logic circuit to reset the attenuator to have the total attenuation to be 0 dB. If the optical signal continues to increase, the attenuator driving circuit will drive the attenuators accordingly until the 30 dB point is reached and the second comparator is activated and changes the second switch's position and causes the logic circuit to reset the attenuator to 0 dB again, giving a total of 30 dB of less gain, not through the attenuation but by the signal redirection.

Figure 5:
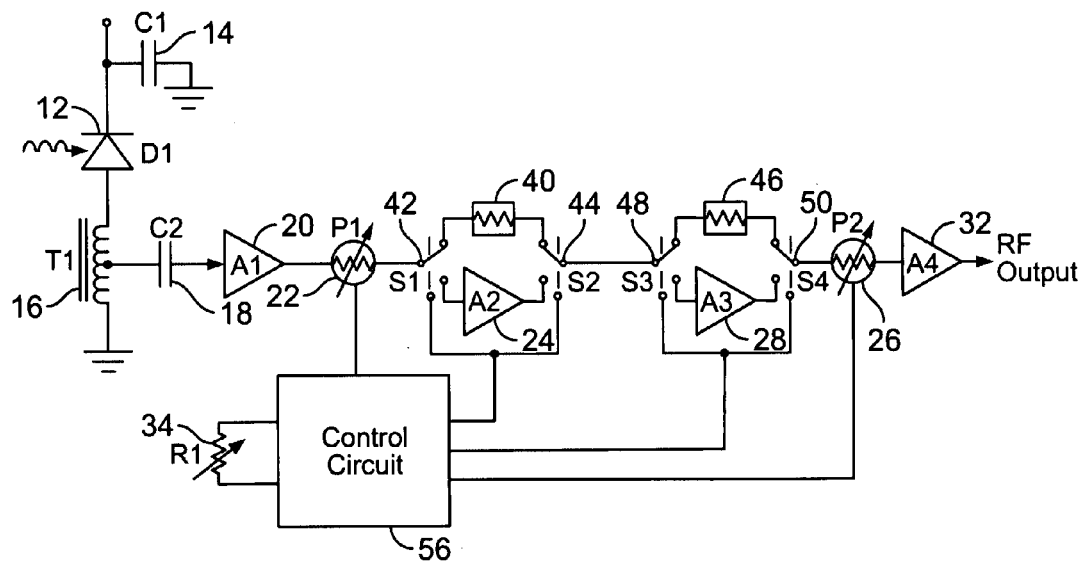
FIGS. 5 and 6 show variations of the FIG. 2 optical receiver.

FIG. 5 is another embodiment of the present optical receiver where AGC is not required but the attenuation is set manually by the user. In the FIG. 5 optical receiver, most elements are identical to those of FIG. 2 and are similarly labeled except that in FIG. 5 the control circuit 56 is controlled (trimmed) by a user interface, including for instance variable resistor R1 58, rather than electrically sensing the power output by the photodiode 12. The user here typically would observe (using suitable instrumentation) the output RF signal from amplifier A4 and thereby set the desired output power level.

Figure 6:
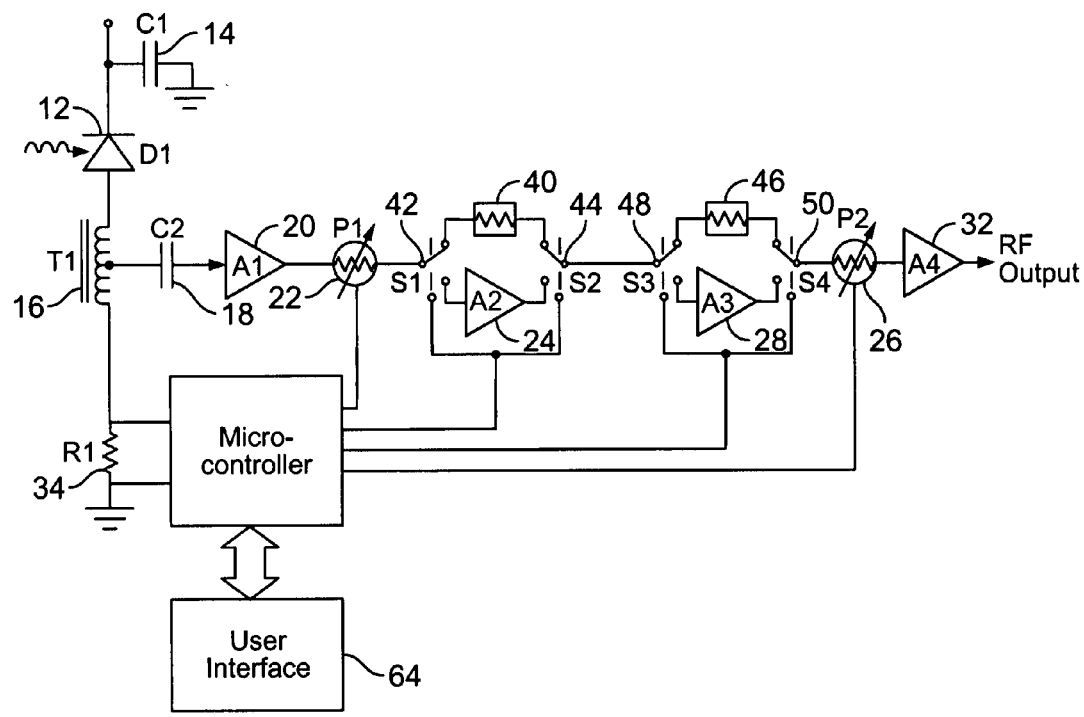

FIG. 6 is an embodiment of the present optical receiver where a combination of optical AGC and user set up is provided. FIG. 6 is largely similar to FIG. 2 and has most of the same elements identically labeled except that here substituted for the control circuit 54 of FIG. 2 there is microcontroller 62 controlled via a user interface 64. The program (firmware) executed by microcontroller 62 carries out the functions described above for control circuit 54 and the firmware is readily coded in light of this disclosure. In this case a suitable analog to digital converter (not shown) is connected between resistor R1 and the input terminals of the microcontroller, and suitable digital to analog converters and drivers (not shown) are connected between each of the output terminals of the microcontroller and the respective control terminals of attenuators P1, P2 and switches S1, S2 and S3, S4. Is it to be understood that microcontroller 62 and user interface 64 need not be dedicated to control of the optical receiver but can also accomplish other tasks, in terms of controlling other circuitry associated with the optical receiver.

This disclosure is illustrative but not limiting; further modifications will be apparent to one skilled in the art in light of this disclosure and are intended to fall within the scope of the appended claims.

The invention claimed is:

1. An optical receiver comprising:
   a photosensitive device; and
   a plurality of series-connected amplifier stages coupled to the photosensitive device;
   wherein a first of the amplifier stages includes an amplifier series-connected to an attenuator, and a second of the amplifier stages includes:
   a second amplifier;
   a second attenuator; and
   a switch coupling either one of the second amplifier or the second attenuator between the first amplifier stage and an output terminal of the optical receiver wherein the switch includes two elements, and each element includes:
   a control terminal;
   a common terminal; and
   two current handling terminals respectively connected to the second amplifier and the second attenuator;
   two diodes respectively connected between the common terminal and the two current handling terminals; and
   a control device having its control electrode connected to the control terminal of the switch element and having an output terminal connected to one of the diodes.

2. The receiver of claim 1, wherein a third of the amplifier stages includes:
   a third amplifier;
   a third attenuator; and
   a second switch coupling one of the third amplifier or the third attenuator between the second amplifier stage and the output terminal of the receiver.

3. The receiver of claim 1, further comprising a control circuit coupled to a control terminal of each of the switch elements.

4. The receiver of claim 3, wherein the control circuit has an input terminal coupled to the photosensitive device.

5. The receiver of claim 3, wherein the control circuit controls the switch elements responsive to the optical power received by the photosensitive device.

6. The receiver of claim 1, wherein the photosensitive device, is one of a photodiode or phototransistor.

7. The receiver of claim 1, further comprising an inductance connected between the photosensitive device and the first amplifier stage.

8. The receiver of claim 3, wherein the control circuit controls the switch elements to provide a maximum power to noise ratio for the optical receiver at any level of output power of the photosensitive device.

9. The receiver of claim 1, wherein the second attenuator is a fixed attenuator.

10. The receiver of claim 1, wherein an RF signal is provided at the output terminal of the optical receiver.

11. A method of operating an optical receiver having a plurality of series-connected stages driven by a photodetector, comprising the acts of:
    determining a level of power output from the photodetector; and
    coupling one of the stages to either amplify or attenuate an input signal from the photodetector in response to the level of power output from the photodetector;
    wherein the one of the stages includes:
    an amplifier;
    an attenuator; and
    a switch coupling one of the amplifier or the attenuator between the photodetector and an output terminal of the optical receiver;
    wherein the switch includes two elements, and each element includes:
    a control terminal;
    a common terminal; and
    two current handling terminals respectively connected to the amplifier and the attenuator;
    two diodes respectively connected between the common terminal and the two current handling terminals; and
    a control device having its control electrode connected to the control terminal of the switch element and having an output terminal connected to one of the diodes.

12. The method of claim 11, further comprising the act of controlling the switch in order to couple the stage to amplify or attenuate.

13. The method of claim 11, wherein the photodetector device is one of a photodiode or phototransistor.

14. The receiver of claim 11, further comprising the act of inductively coupling the photodetector to the stage.

15. The method of claim 11, further comprising the act of controlling the coupling to provide a maximum power to noise ratio for the optical receiver at any level of output power from the photodetector.

16. The method of claim 11, wherein the attenuator is a fixed attenuator.

17. The method of claim 11, further comprising the act of electrically sensing the level of output power.

18. The method of claim 11, further comprising the act of applying an analog optical signal to the photodetector.

19. The method of claim 11, further comprising the act of amplifying the input signal from the photodetector prior to the act of coupling the input signal to either amplify or attenuate.

20. The receiver of claim 1, further comprising a second single pole double throw switch coupling either one of the second amplifier or the second attenuator to the output terminal.

21. The method of claim 11, further comprising the act of coupling the one of the stages to an output terminal of the optical receiver by single pole double throw switching.

* * * * *